April 30, 1957 V. J. KOMUCHAR ET AL 2,790,565
SELF UNLOADING VEHICLE
Filed Oct. 7, 1954 5 Sheets-Sheet 1

INVENTORS
VICTOR J. KOMUCHAR
DARYL D. CERNY
Paul O. Pippel
ATTORNEY

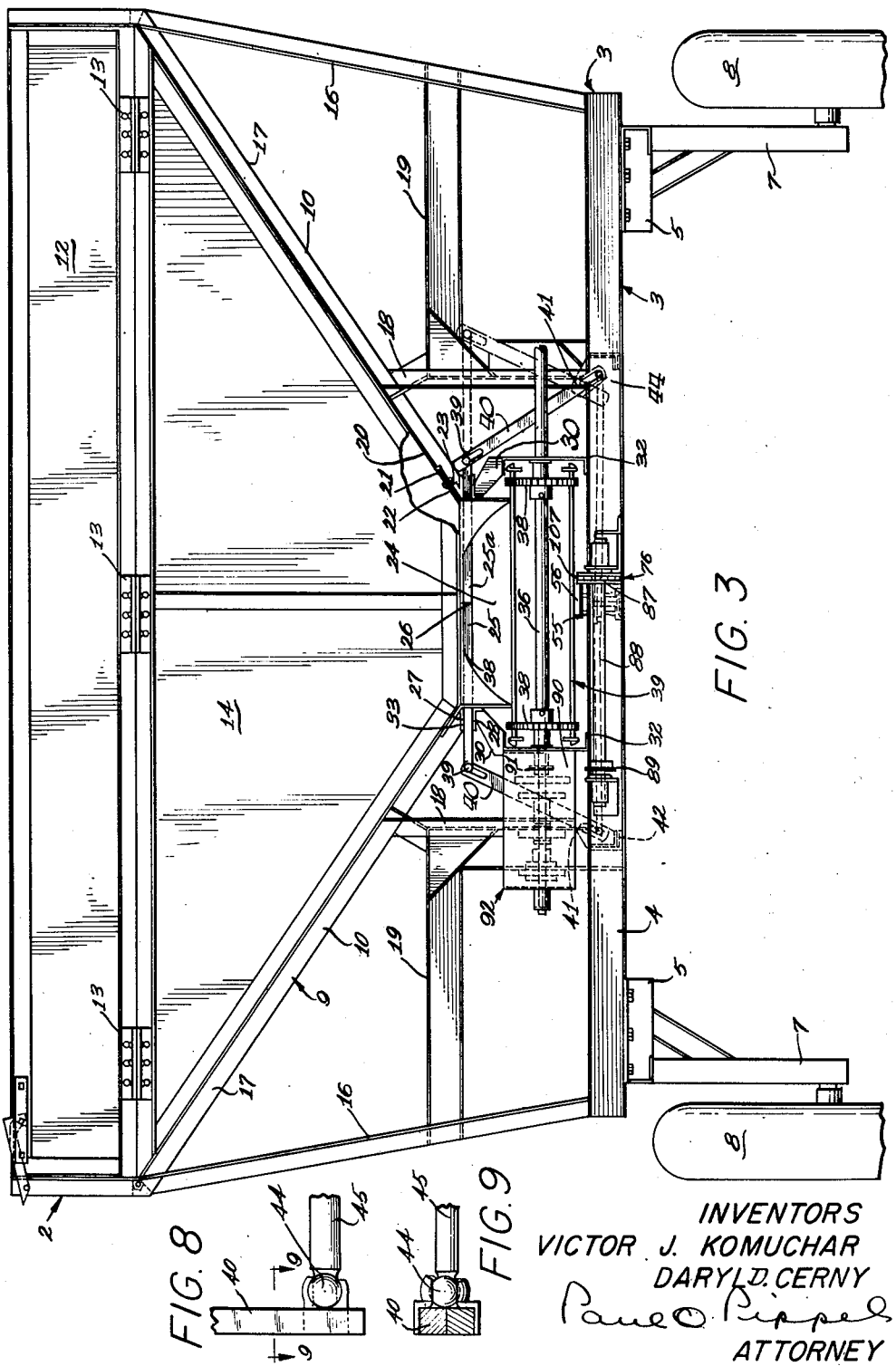

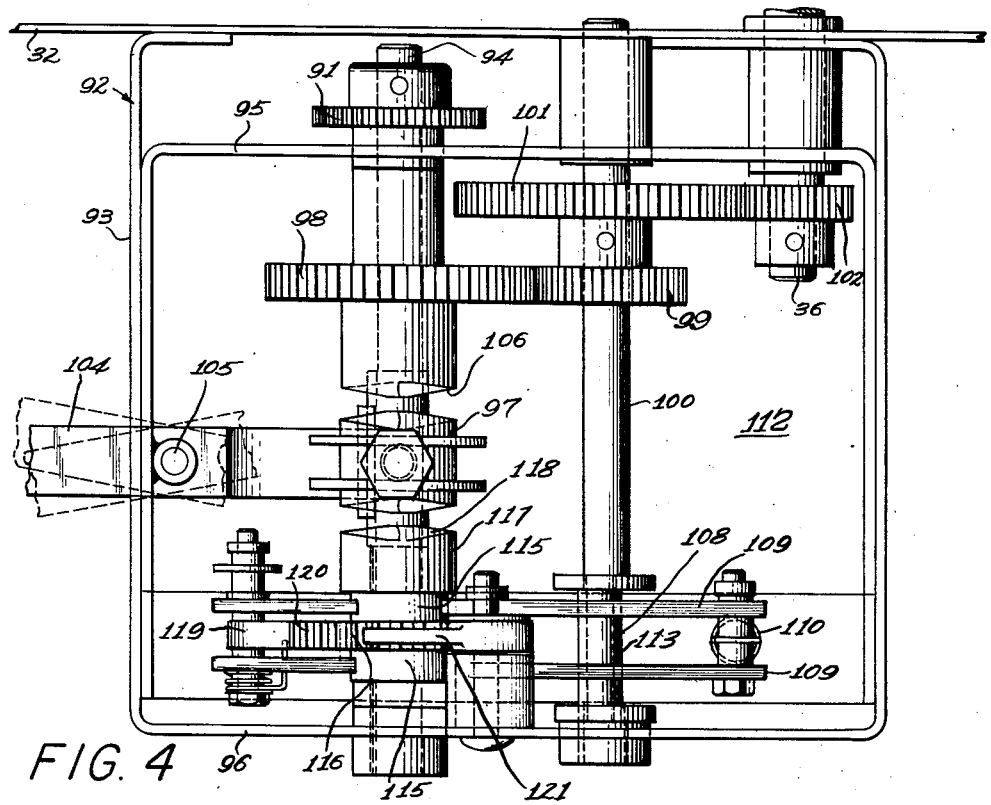

April 30, 1957    V. J. KOMUCHAR ET AL    2,790,565
SELF UNLOADING VEHICLE
Filed Oct. 7, 1954    5 Sheets-Sheet 5

INVENTORS.
VICTOR J. KOMUCHAR
DARYL D. CERNY
Paul O. Pippel
ATTORNEY

United States Patent Office 2,790,565
Patented Apr. 30, 1957

2,790,565

SELF UNLOADING VEHICLE

Victor J. Komuchar, Palos Park, and Daryl D. Cerny, Oaklawn, Ill., assignors to International Harvester Company, a corporation of New Jersey Application October 7, 1954, Serial No. 460,976

6 Claims. (Cl. 214—83.2)

This invention relates to self unloading vehicles, and more specifically to a type for unloading crops in a gentle and efficient manner without bruising or damaging the crop such as potatoes.

A general object of the invention is to devise a novel self unloading vehicle of a type incorporating a sectional bottom which is automatically serially opened in order to discharge the crop in increments.

A more specific object of the invention is to devise a novel mechanism for automatically opening the bottom sections.

These and other objects of the invention will become more apparent from the specification and the drawings wherein:

Figure 3 is a rear view of the vehicle;

Figure 4 is a plan view of the drive gearing;

Figure 5 is a side elevational view of the structure shown in Figure 4 with portions of the casing broken away in order to more clearly illustrate the construction;

Figure 8 is a vertical sectional view taken substantially on the line 8—8 of Figure 1; and Figure 9 is a horizontal transverse view taken substantially on the line 9—9 of Figure 8.

Figure 1:
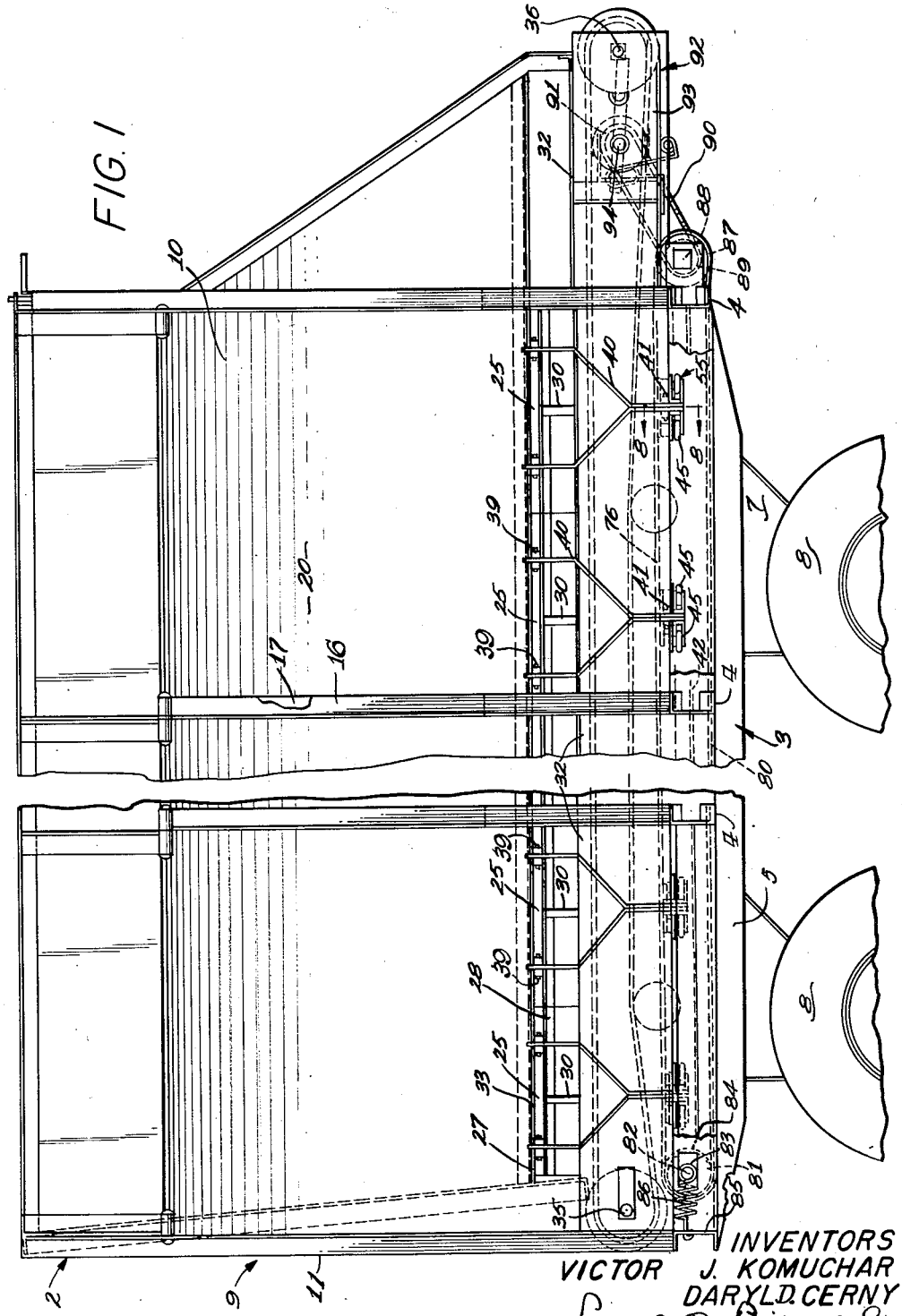
Figure 1 is a broken apart side elevational view of the novel self unloading vehicle.

Describing the invention in detail, the vehicle generally designated 2 comprises a chassis or framework 3, including a plurality of cross members 4, and supporting interconnected side sills 5, 5 which carry pedestals 7 supporting a plurality of wheels 8. The chassis 3 supports a box, generally designated 9, which includes a pair of downwardly converging side walls 10, which are spaced laterally at their lower ends, the sides 10, 10 are interconnected at their forward ends by an upright front wall 11, and at their upper rear extremities by means of a rear wall section 12, which at its lower edge has hinge connections at 13 with a gate 14, which extends between the walls 10, 10, and is adapted to be swung rearwardly in order to open the rear of the box.

Figure 2:
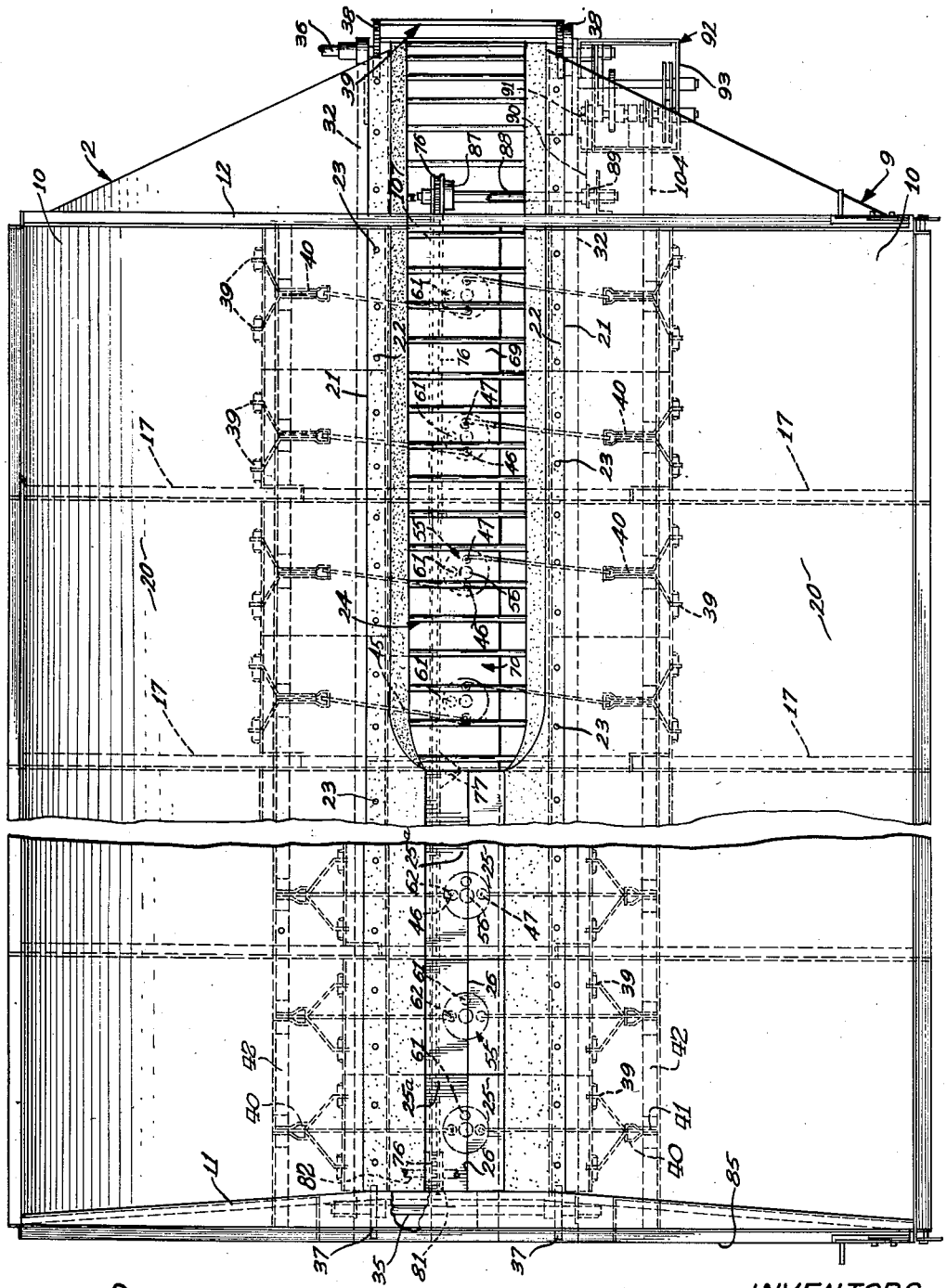
Figure 2 is a plan view thereof.

The chassis incorporates a plurality of upright beam members 16, 16, which join at their upper ends with the upper ends of the beam members 17 of the respective walls 10, the lower ends of the chassis frame members 16 being connected to the cross members 4. The chassis 3 also incorporates other upright members 18, which at their upper ends interconnect with intermediate portions of the beam members 17 of the walls 10. The lower ends of the beam members 18 being connected to the beam members 4, and the beam members 18 being connected intermediate their ends by generally horizontal beams or braces 19, which connect with the adjacent outer beam 16. The sides 10 of the box preferably are formed of metal such as steel or aluminum in order to provide a smooth discharge surface, and the lower end of each panelling 20 of each side wall 10 is offset downward as at 21 to form a pocket which receives a longitudinal edge portion 22 therein of a flexible flap or guide formed of material reinforced rubber sheet, said guides being riveted as at 23 to the panelling 20 and extending inwardly therefrom over the discharge opening or elongated slot generally indicated 24. It will be readily appreciated that these flexible guides provide a gentle path for the flow of the crops from the side walls to the discharge opening 24, which is normally closed by a plurality of opposed board sections or floor plate elements 25, 25a, disposed in abutting relationship as at 26. It will be observed from a consideration of Figure 2 that a series or row of these board sections 25, 25a are provided from the rear to the front end of the wagon at opposite sides of the slot, and that these are disposed in side by side abutting relationship. Each board section 25, 25a is slidably mounted between a pair of opposed top and bottom guide rails 27 and 28, the bottom channel guides 28 being supported by gussets 30 from longitudinal beam members 32 which are connected to the members 4 to form part of the chassis; and the top guide rail 27 is connected to the lower ends of the reinforcing beams 17 of the respective side walls 10. The members 27 and 28 are vertically spaced to define a guide slot 33 therebetween receiving the related board section 25 or 25a therebetween, the slot being open into the box adjacent to the lower edges of the side walls 10. It will be observed that each floor section is constituted of a pair of opposed board members or elements 25, 25a and that these board sections in the closed position cover the discharge opening 24, which extends the full length of the box. The beam members 32, 32, are spaced laterally of the wagon at opposite sides of the opening 24, and rotatably support adjacent to the front and rear of the wagon, a pair of cross shafts 35 and 36, the forward shaft 35 carrying a pair of laterally spaced sprockets 37, 37 and the rear shaft carrying keyed thereto, a pair of laterally spaced sprockets 38, 38 and the sprockets 37 and 38 support a chain type of an endless apron conveyor 39, which spans the entire width of the discharge opening 24.

Each board section 25 has its outer edge connected by means of a sliding pivot 39 to the upper end of a lever member 40, which intermediate its ends is pivoted on a substantially horizontal axis as at 41 to a longitudinal beam member 42 of the chassis, and the lower end of each lever 40 has a universal connection 44 with the outer end of an associated actuating link 45. From a consideration of Figure 1, it will be readily apparent that the lever 40 is Y-shaped in end view and that its upper spaced legs are pivoted at a plurality of points 39 to the related floor section 25. This insures that the board will move translationally lengthwise in and out in a guided path.

The inner ends of the links or rods 45 of the opposed companion board segments 25, 25a, are pivoted respectively on generally vertical axes, as at 46 and 47, on bolts 48 and 49 (Figures 6 and 7), which bolts pass through upper and lower plates 50 and 51, which are separated by spacers 52, 53, and 54, of a double crank assembly or rotary actuator, generally designated 55. The plates 50 and 51 are journalled on a vertical axis by means of a bolt 56, which extends through central apertures 57 and 58 in said plates 50 and 51 with a spacer sleeve 59. Said bolt 56 being fastened to a longitudinal channel member disposed beneath the assembly 55 and extending the full length of the box and connected to the chassis underframe structure members 4. Above the top plate 50 there are provided a pair of cam members in the form of rollers 61 and 62 spaced 90 degrees apart and journalled on bolts 63 and 48 respectively, said bolt 63 carrying a spacer sleeve 65 (Figure 6) between its head and the nut thereon, and with the spacer sleeve passing through vertically aligned apertures in the plate 50, and a rigidifying or positioning plate 67 which also overlies the roller 62; the head at the upper end of the bold 48 engaging the upper side of the plate 67.

Figure 6:
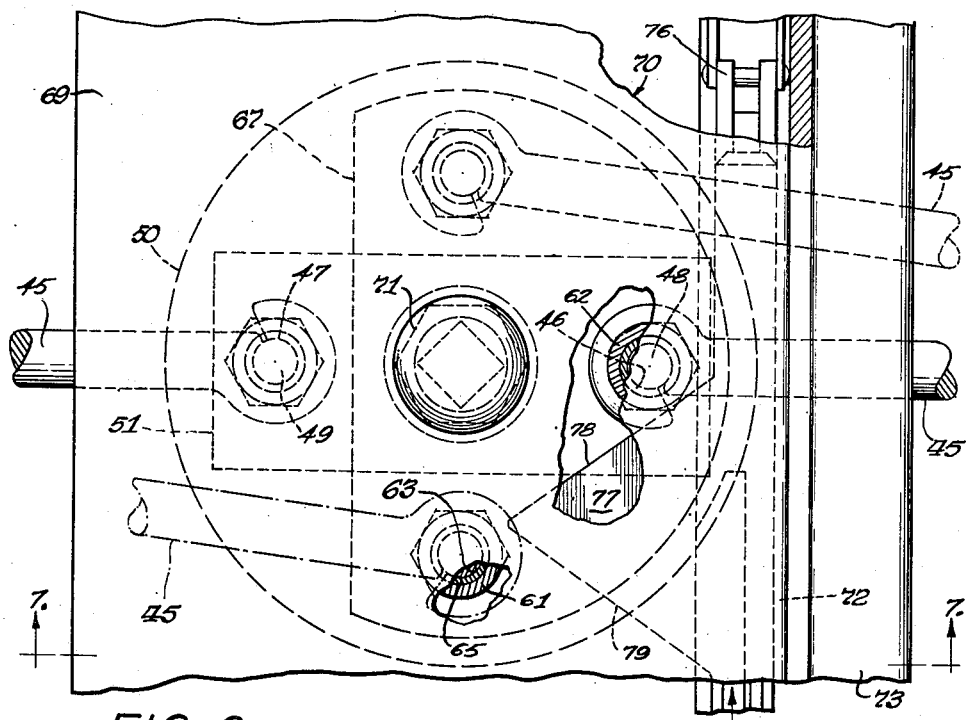
Figure 6 is a fragmentary enlarged plan view of one of the means for opening and closing the floor sections.
Figure 7:
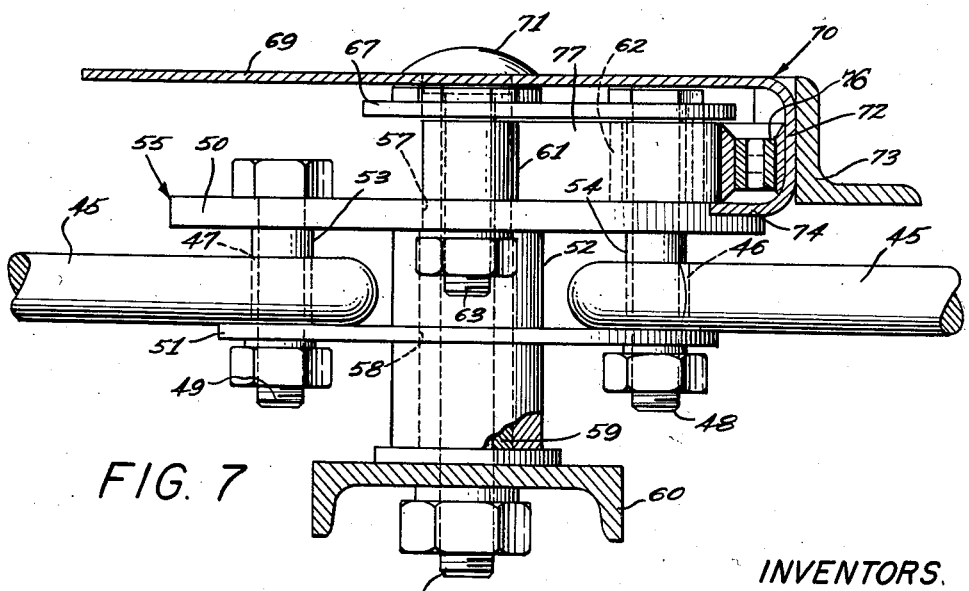
Figure 7 is a transverse vertical sectional view taken substantially on the line 7—7 of Figure 6.

As best seen in Figures 6 and 7, the upper end of the mounting bolt 56 extends through a horizontal plate portion 69 of a combination shield and chain guide member, generally designated 70, which is U-shaped in cross section and comprises the upper plate portion or shield portion 69 against which the head 71 of each bolt 56 seats, the top plate portion 69 being integrally united along one end with the upper edge of a vertical wall portion 72, which is connected preferably as by welding to a support channel member 73 suitably connected to the cross members 4 of the chassis. The lower edge of the longitudinal web 72 is connected to a substantially horizontal lower wall or web 74 of the longitudinal guide or track and a chain member 76 is guided between the walls 69 and 74 along the wall 72, said chain incorporating a wedge-shaped cam or trip member 77 which is moved with the chain and positioned thereby in the horizontal plane and in the path of the cam members 61 and 62. It will be readily observed from a consideration of Figures 6 and 7 that the cam member 77 has forward and rearward edges 78 and 79 which are oblique to the direction of travel of the chain indicated by the arrow in Figure 6. The chain 76 is an endless type with its top run tracking in the channel 70, and its bottom run 80 running beneath the chassis framework of the wagon as best seen in Figure 1, the forward extremity of the chain 76 being trained about a sprocket 81, which is carried on a shaft 82, rotatably supported on journal bearings 83, which are slidably mounted within a support framework 84 connected to the front beam member 85 of the wagon box, said shaft being associated with a tension spring assembly 86 which is hooked to the front beam member 85 for maintaining the chain 80 taut. The rear end of the chain 80 is mounted on a sprocket 87 which is keyed to a shaft 88 which is journalled on appropriate angle irons connected to the rear cross beam 4, the shaft 88 is constrained for rotation with a sprocket 89 keyed thereto, and sprocket 89 being driven by a chain 90, which in turn is trained about an output sprocket 91 of a transmission assembly generally designated 92, and incorporating a substantially square sided casing 93 mounted upon a chassis frame member 32. The sprocket 91 is keyed to a shaft 94 which is journalled on opposite side walls 95 and 96 of the gear case 93, and the shaft 91 supports intermediate its ends a double jaw clutch 97 for axial movement thereon, the clutch 97 being keyed to the shaft 94 for rotation therewith. One end of the shaft 97 rotatably supports a gear member 98 which meshes with a companion gear member 99 keyed to a countershaft 100, journalled at opposite ends on the walls 95 and 96, and said shaft 100 having another gear 101 keyed thereto meshing with a companion gear 102 on a power input shaft 36 of the conveyor, the shaft 36 being journalled on the wall 95 of the gear case. The shaft 36 is adapted for connection to any source of power such as a power take-off of a tractor or truck or to an electric motor or the like. It will be observed that the shaft 36 drives the apron 39 continuously, and that through the gear 102 transmits the power to gear 101, which in turn transmits it to the gear 99, which in turn transmits the power to the gear 98. If upon actuation of the lever 104, which is pivoted on a substantially vertical axis 105 on the bottom wall 112 of the case transverse to the axis of the shaft 94, the double jaw clutch 97 is urged into engagement with a jaw 106 which is connected and integrally formed on the gear 98, the power will be transmitted at a fast speed to the shaft 94 which in turn will transmit the power to the sprocket 91, and from thence to the chain 90, and thus to the sprocket 89 and the shaft 87 and drive the sprocket 87 which moves the chain 76 in such a direction that the upper run 107 of this chain 76 is advanced rearwardly, that is, from the front end to the rear end of the box. Under such conditions the rear cam edge 79 of the cam member 77, which is moved by the chain 76 will engage with the cam members 61 sequentially as will be readily apparent in Figure 2, and rotate the crank assemblies in a clockwise direction (Figure 2) to a position disposing the crank assemblies as shown in the left portion of Figure 2. It will be realized that the cranking motion is transmitted to the links 45, 45, which in turn rotate their respective levers in directions moving the associate pair of board sections 25 and 25a toward each other to close the wagon bottom. Upon the last board being closed, the operator merely shifts the lever member 104 of the transmission into neutral as shown in solid lines whereat the clutch 97 is disengaged from the clutch 106.

It will be observed in Figures 4 and 5 that one end of the shaft 100 is provided with a crank 108 which engages with the underside of a pair of arms 109, the ends of which are connected to the upper end of a tension spring 110, the tension spring being connected as at 111 at its lower end to the bottom wall 112 of the gear box, and constantly urging the arm members 109 downwardly into contact with the throw portion 113 of the crank 108. The arms 109 are pivotally mounted intermediate their ends by means of bearings 115 on the shaft 94 at opposite sides of a ratchet wheel 116 which incorporates an axially directed collar 117 extending through one of the bearings 115, and provided with a jaw clutch portion 118 adapted for mating engagement with an opposed jaw clutch portion of the clutch member 97. The opposite ends of the arms 109 are associated with an adjustable driving pawl 119 which is adapted for engagement with one, two, or three teeth 120 on the ratchet wheel 116. The wall 96 of the gear case supports a holding pawl 121, which engages with the teeth 120 of the ratchet wheel to prevent counter-rotation. It will be observed that upon engagement of the clutch 97 with the clutch portion 118 of the ratchet wheel, a step-by-step rotary movement is imparted to the shaft 94 in a direction reversed and at a slower speed to that which is obtained through the gears 99, 98. This direction of rotation moves the upper run 107 of the chain 76, in a direction moving the cam member 77 from the rear end to the front end of the box. And it will be observed that inasmuch as the opposed board sections are all closed, the cam member or roller 62, which is disposed at 90 degrees from the roller 61, as best shown in Figure 6 of each crank assembly 55 is in the path of the actuator or cam member 77, and that these cams 62 as seen in the left half of Figure 2 of each crank assembly 55 are engaged sequentially from the rear to the front end of the box by the forward edge 78 of the cam member 77, and upon such engagement, and the cam member moving forwardly, the same will rotate the crank in a counterclockwise direction (Figure 6) to a position disposing the movement transmitting links 45 of the opposed pair of board sections 25, 25a in the position shown in phantom lines in said Figure 6 and in the right half of Figure 2. This rotary movement pulls each link inwardly, which in turn rotates the associated lever members 40 in directions drawing the related board sections 25 and 25a from across the opening 24, and opening said opening to the interior of the box and the increment which is directly in vertical alignment with the open section of the box and the crop will discharge directly downwardly onto the top run of the conveyor and be discharged thereby. It will be appreciated that the speed at which the sections are adapted to sequentially open, will be governed by the nature of the crop to be discharged, and that this relationship may be proportioned to suit the needs. Upon the last segment being opened, the operator merely throws the lever 104 into neutral and allows the remainder of the crop to be discharged. In order to close the bottom, the operator will rotate the lever 104 in a direction engaging the jaw clutch 97 with the clutch portion 106 on the gear 98, and of course the rotation will be reversed, and at a higher speed than the direction of rotation of the shaft 94 when opening the board sections, and of course the top run of the chain 76 with the actuator 77 will move rearwardly and will sequentially engage the bearing members 61 which are in its path and rotate the respective crank assemblies to the position which are shown in solid lines in Figure 6 whereupon the opposed board sections 25, 25a will close. The operator then disconnects the shaft 36 from its power source.

What is claimed is:

1. In a self unloading vehicle comprising a box with an elongated bottom discharge slot, closure means for said slot movably mounted on said box, operating means for progressively moving said closure means in the order for opening said slot from one end to the other thereof and for closing said slot in the reverse order, an endless conveyor supported by said box beneath said slot in substantially parallel vertical alignment therewith and having an upper run movable lengthwise of said slot in a direction toward said one end of said slot, and power transmission means operatively associated with said operating means and including first and second power transmitting trains, said first transmission train having a slower speed than said second, said first transmission train mobilizable to actuate said operating means in a direction for opening said closure means at a slow rate, and said second transmission train mobilizable for actuating said operating means in a direction closing said closure means at a substantially faster rate.

2. The invention according to claim 1 and said box comprising laterally spaced side walls converging downwardly toward said slot and having lower edges defining opposite margins of said slot, and flexible flaps connected to the lower edge portions of said side walls and having a lateral extent greater than the distance from the lower edge of the associated side wall to the top run of said conveyor, and positioned to lay over said closure means in the closed position thereof and providing an extension of the related side wall to said top run of said conveyor to afford a gentle guide surface for material nischarging from said side walls onto said conveyor.

3. In a self unloading vehicle having a chassis and a box thereon with downwardly sloping sides defining a bottom discharge slot extending from the front to the rear of said vehicle, a conveyor carried on the chassis in receiving relation to said slot and discharging lengthwise of the slot toward one end thereof, closure means having a plurality of sections movably mounted on said chassis, and arranged to collectively cover the entire slot in the closed position thereof and selectively movable to open position to uncover a corresponding portion of the slot, and means described in the closed position of said closure means for automatically moving said sections to open position in the order from said one end of said slot to the other and for moving said section from open to closed position in the order from said other to said one end of said slot and comprising a crank operatively associated with each section and having first and second cams angularly separated from each other, and trip means carried by the chassis in a path for engaging said first cams attendant to movement of said trip means in one direction for rotating each of said cranks and incidentally positioning the same with said second cams in said path for engagement by said trip means upon reverse movement thereof, said last mentioned means incorporating a step-by-step transmission train for slowly opening said sections and a reverse drive of substantially higher speed ratio than said transmission for rapidly closing said sections.

4. In a self unloading vehicle comprising a load sustaining structure including a frame and a box thereon, said box having a bottom with an elongated discharge slot, an endless conveyor carried on said frame and having a run disposed in receiving relation to said slot, closure means supported on the frame at opposite sides of said slot for translational movement into said slot in closing relationship thereto over said conveyor and out of said slot to open position whereat material within the box is caused to deposit onto said conveyor run, said closure means comprising a pair of members opposed to each other at opposite sides of the slot, a lever associated with each member and having a slotted pivotal connection at its upper end thereto and pivoted on a generally horizontal axis intermediate its ends to the frame, operating means for the levers of said pair comprising a rotary crank assembly journalled on the frame on a substantially vertical axis beneath said conveyor, pivot means disposed at diametrically opposite sides of said axis of pivot of said rotary crank assembly, a pair of links pivoted to respective pivot means at one end and operatively connected to the lower end of respective levers at their other ends, and operating means for rotating said crank means in one direction for actuating said links and levers to move said closure members to open postion and in the opposite direction to shift said members to closed position.

5. The invention according to claim 4 and said crank means comprising a plate structure, and said operating means comprising a plurality of cams spaced circumferentially on said plate structure, a cam guide supported on said frame, cam means carried on said guide, means for selectively moving said cam means in either direction along said guide, said guide located alongside said plate structure with said cam means in engaging position to one of said cams in one direction of movement thereof and engaging position to the other cam in the opposite direction of movement of said cam means.

6. The invention according to claim 5 and said means for selectively moving said cam means including an endless chain having opposite ends connected to opposite ends of said cam means, rotary support means for said chain at opposite ends of said guide, transmission means connected to one of said rotary support means and including two power trains for selectively moving said chain in either direction.

References Cited in the file of this patent

UNITED STATES PATENTS

| | | |
|---|---|---|
| 1,122,273 | Hansen | Dec. 29, 1914 |
| 2,300,753 | Wagner et al. | Nov. 3, 1942 |
| 2,328,675 | Ribbans | Sept. 7, 1943 |
| 2,520,291 | Wall | Aug. 29, 1950 |
| 2,589,988 | Bruno | Mar. 18, 1952 |
| 2,668,629 | Dahlman | Feb. 9, 1954 |
| 2,743,026 | Edwards | Apr. 24, 1956 |